(12) United States Patent
King et al.

(10) Patent No.: US 9,640,016 B2
(45) Date of Patent: May 2, 2017

(54) PARKING METER

(71) Applicant: IPS Group, Inc., San Diego, CA (US)

(72) Inventors: David William King, Rancho Santa Fe, CA (US); Murray David Kirby Hunter, San Diego, CA (US); Matthew James Hall, San Diego, CA (US); David Andrew Jones, San Diego, CA (US)

(73) Assignee: IPS GROUP INC., San Diego, CA (US)

( * ) Notice: Subject to any disclaimer, the term of this patent is extended or adjusted under 35 U.S.C. 154(b) by 0 days.

(21) Appl. No.: 14/698,806

(22) Filed: Apr. 28, 2015

(65) Prior Publication Data

US 2015/0235503 A1    Aug. 20, 2015

Related U.S. Application Data

(63) Continuation of application No. 14/059,260, filed on Oct. 21, 2013, now abandoned, which is a
(Continued)

(30) Foreign Application Priority Data

Feb. 27, 2007   (AU) ................................ 2007900999

(51) Int. Cl.
*G07F 9/10*       (2006.01)
*G07F 17/24*      (2006.01)
(Continued)

(52) U.S. Cl.
CPC .......... *G07F 17/248* (2013.01); *G06Q 20/127* (2013.01); *G06Q 20/34* (2013.01); *G07F 9/10* (2013.01); *G07F 17/0021* (2013.01)

(58) Field of Classification Search
CPC ........... G07F 9/10; G07F 17/24; G07F 17/248
(Continued)

(56) References Cited

U.S. PATENT DOCUMENTS 2,161,046 A   6/1939   Hitzeman
2,822,682 A   2/1958   Sollenberger
(Continued)

FOREIGN PATENT DOCUMENTS

CA    2377010 A1    10/2001
CA    2363915 A1    5/2003
(Continued)

OTHER PUBLICATIONS

Petition for Inter Partes Review of U.S. Pat. No. 7,854,310. IPR Case No. IPR2016-00067, filed Oct. 22, 2015, (66 pages).
(Continued)

*Primary Examiner* — Mark Beauchaine
(74) *Attorney, Agent, or Firm* — Wilson Sonsini Goodrich & Rosati (57) ABSTRACT

A parking meter assembly (10) including a base (11) that is to be fixed to or embedded in a ground surface, typically adjacent the curb that which a car is to be parked. The assembly (10) also includes a parking meter (13) having a front face (17) that includes a coin slot (25) a card slot (20) and a control panel (21). The parking meter (13) further includes a rear face (27) having a window aperture (28) that provides for the transmission of light to a solar panel (29) behind the aperture (28).

12 Claims, 5 Drawing Sheets

Related U.S. Application Data continuation of application No. 12/973,109, filed on Dec. 20, 2010, now Pat. No. 8,590,687, which is a continuation of application No. 12/072,524, filed on Feb. 27, 2008, now Pat. No. 7,854,310.

(51) Int. Cl.
  *G06Q 20/12* (2012.01)
  *G07F 17/00* (2006.01)
  *G06Q 20/34* (2012.01)

(58) Field of Classification Search
  USPC .......................................................... 194/350
  See application file for complete search history.

(56) References Cited

U.S. PATENT DOCUMENTS

| | | | |
|---|---|---|---|
| 2,832,506 A | 4/1958 | Hatcher | |
| 2,988,191 A | 6/1961 | Grant | |
| 3,183,411 A | 5/1965 | Palfi | |
| 3,535,870 A | 10/1970 | Harold | |
| 3,721,463 A | 3/1973 | Attwood et al. | |
| 3,999,372 A | 12/1976 | Welch et al. | |
| 4,043,117 A | 8/1977 | Maresca et al. | |
| 4,812,805 A | 3/1989 | Lachat et al. | |
| 4,823,928 A | 4/1989 | Speas | |
| 4,825,425 A | 4/1989 | Turner | |
| 4,875,598 A | 10/1989 | Dahl | |
| 4,880,097 A | 11/1989 | Speas | |
| 4,895,238 A | 1/1990 | Speas | |
| 5,065,156 A | 11/1991 | Bernier | |
| 5,222,076 A | 6/1993 | Ng et al. | |
| 5,244,070 A | 9/1993 | Carmen et al. | |
| 5,273,151 A | 12/1993 | Carmen et al. | |
| 5,360,095 A | 11/1994 | Speas | |
| 5,442,348 A | 8/1995 | Mushell | |
| 5,563,491 A | 10/1996 | Tseng | |
| 5,614,892 A | 3/1997 | Ward, II et al. | |
| 5,617,942 A | 4/1997 | Ward, II et al. | |
| 5,640,002 A | 6/1997 | Ruppert et al. | |
| 5,648,906 A | 7/1997 | Amirpanahi | |
| 5,659,306 A | 8/1997 | Bahar | |
| 5,710,743 A | 1/1998 | Dee et al. | |
| 5,737,710 A | 4/1998 | Anthonyson | |
| 5,778,067 A | 7/1998 | Jones et al. | |
| 5,806,651 A | 9/1998 | Carmen et al. | |
| 5,833,042 A | 11/1998 | Baitch et al. | |
| 5,841,369 A | 11/1998 | Sutton et al. | |
| 5,842,411 A | 12/1998 | Johnson | |
| 5,845,268 A | 12/1998 | Moore | |
| 5,852,411 A | 12/1998 | Jacobs et al. | |
| 5,954,182 A | 9/1999 | Wei | |
| 6,037,880 A | 3/2000 | Manion | |
| 6,078,272 A | 6/2000 | Jacobs et al. | |
| 6,081,205 A | 6/2000 | Williams | |
| 6,111,522 A | 8/2000 | Hiltz et al. | |
| 6,116,403 A | 9/2000 | Kiehl | |
| 6,195,015 B1 | 2/2001 | Jacobs et al. | |
| 6,229,455 B1 | 5/2001 | Yost et al. | |
| 6,230,868 B1 | 5/2001 | Tuxen et al. | |
| 6,309,098 B1 | 10/2001 | Wong | |
| 6,312,152 B2 | 11/2001 | Dee et al. | |
| RE37,531 E | 1/2002 | Chaco et al. | |
| 6,373,422 B1 | 4/2002 | Mostafa | |
| 6,456,491 B1 | 9/2002 | Flannery et al. | |
| 6,457,586 B2 | 10/2002 | Yasuda et al. | |
| 6,505,774 B1 | 1/2003 | Fulcher et al. | |
| 6,697,730 B2 | 2/2004 | Dickerson | |
| 6,747,575 B2 | 6/2004 | Chauvin et al. | |
| 6,856,922 B1 | 2/2005 | Austin et al. | |
| 6,914,411 B2 | 7/2005 | Couch et al. | |
| 6,929,179 B2 | 8/2005 | Fulcher et al. | |
| 7,019,420 B2 | 3/2006 | Kogan et al. | |
| 7,019,670 B2 | 3/2006 | Bahar | |
| 7,027,773 B1 | 4/2006 | McMillin | |
| 7,183,999 B2 | 2/2007 | Matthews et al. | |
| 7,222,031 B2 | 5/2007 | Heatley | |
| 7,237,716 B2 | 7/2007 | Silberberg | |
| 7,388,349 B2 | 6/2008 | Elder et al. | |
| 7,748,620 B2 | 7/2010 | Gomez et al. | |
| 7,772,720 B2 | 8/2010 | McGee et al. | |
| 7,780,072 B1 * | 8/2010 | Lute | G07F 19/20 235/379 |
| 7,806,248 B2 | 10/2010 | Hunter et al. | |
| 7,854,310 B2 | 12/2010 | King et al. | |
| 7,855,661 B2 | 12/2010 | Ponert | |
| 7,933,841 B2 | 4/2011 | Schmeyer et al. | |
| 8,138,950 B1 | 3/2012 | Leung | |
| 8,395,532 B2 | 3/2013 | Chauvin et al. | |
| 8,479,909 B2 | 7/2013 | King et al. | |
| 8,513,832 B2 | 8/2013 | Hunter et al. | |
| 8,566,159 B2 | 10/2013 | King et al. | |
| 8,590,687 B2 * | 11/2013 | King | G06Q 20/127 194/350 |
| 8,595,054 B2 * | 11/2013 | King | G06Q 20/127 340/870.02 |
| 8,684,158 B2 | 4/2014 | Jones et al. | |
| 8,749,403 B2 | 6/2014 | King et al. | |
| 8,862,494 B2 | 10/2014 | King et al. | |
| 2001/0012241 A1 | 8/2001 | Dee et al. | |
| 2001/0047278 A1 | 11/2001 | Brookner et al. | |
| 2001/0051531 A1 | 12/2001 | Singhal et al. | |
| 2002/0008639 A1 | 1/2002 | Dee | |
| 2002/0111768 A1 | 8/2002 | Ghorayeb et al. | |
| 2003/0092387 A1 | 5/2003 | Hjelmvik | |
| 2003/0112151 A1 | 6/2003 | Chauvin et al. | |
| 2003/0112597 A1 | 6/2003 | Smith | |
| 2003/0121754 A1 | 7/2003 | King | |
| 2003/0128010 A1 | 7/2003 | Hsu | |
| 2003/0128136 A1 | 7/2003 | Spier et al. | |
| 2003/0132840 A1 | 7/2003 | Bahar | |
| 2003/0140531 A1 | 7/2003 | Pippins | |
| 2003/0144972 A1 | 7/2003 | Cordery et al. | |
| 2003/0169183 A1 | 9/2003 | Korepanov et al. | |
| 2003/0179107 A1 | 9/2003 | Kibria et al. | |
| 2003/0220835 A1 | 11/2003 | Barnes | |
| 2003/0222792 A1 | 12/2003 | Berman et al. | |
| 2004/0068434 A1 | 4/2004 | Kanekon | |
| 2004/0084278 A1 | 5/2004 | Harris et al. | |
| 2004/0094619 A1 | 5/2004 | Silberberg | |
| 2004/0181496 A1 | 9/2004 | Odinotski et al. | |
| 2004/0264302 A1 | 12/2004 | Ward | |
| 2005/0040951 A1 | 2/2005 | Zalewski et al. | |
| 2005/0178639 A1 | 8/2005 | Brumfield et al. | |
| 2005/0192911 A1 | 9/2005 | Mattern | |
| 2006/0021848 A1 | 2/2006 | Smith | |
| 2006/0116972 A1 | 6/2006 | Wong | |
| 2006/0149684 A1 | 7/2006 | Matsuura et al. | |
| 2006/0152349 A1 | 7/2006 | Ratnakar | |
| 2006/0267799 A1 | 11/2006 | Mendelson | |
| 2007/0016539 A1 | 1/2007 | Groft et al. | |
| 2007/0094153 A1 | 4/2007 | Ferraro | |
| 2007/0114849 A1 | 5/2007 | Falik et al. | |
| 2007/0119682 A1 | 5/2007 | Banks et al. | |
| 2007/0136128 A1 | 6/2007 | Janacek et al. | |
| 2007/0184852 A1 | 8/2007 | Johnson et al. | |
| 2007/0210935 A1 | 9/2007 | Yost et al. | |
| 2007/0285281 A1 | 12/2007 | Welch et al. | |
| 2008/0071611 A1 | 3/2008 | Lovett | |
| 2008/0093454 A1 | 4/2008 | Yamazaki et al. | |
| 2008/0147268 A1 | 6/2008 | Fuller | |
| 2008/0208680 A1 | 8/2008 | Cho | |
| 2008/0238715 A1 | 10/2008 | Cheng et al. | |
| 2009/0109062 A1 | 4/2009 | An | |
| 2009/0183966 A1 | 7/2009 | King et al. | |
| 2009/0192950 A1 | 7/2009 | King et al. | |
| 2009/0267732 A1 | 10/2009 | Chauvin et al. | |
| 2009/0284907 A1 | 11/2009 | Regimbal et al. | |
| 2009/0315720 A1 | 12/2009 | Clement et al. | |
| 2010/0106517 A1 | 4/2010 | Kociubinski et al. | |
| 2010/0188932 A1 | 7/2010 | Hanks et al. | |
| 2011/0313822 A1 | 12/2011 | Burdick | |
| 2012/0285790 A1 | 11/2012 | Jones et al. | |
| 2012/0285792 A1 | 11/2012 | Jones et al. | |

(56) References Cited

U.S. PATENT DOCUMENTS

| | | |
|---|---|---|
| 2013/0005445 A1 | 1/2013 | Walker et al. |
| 2013/0027218 A1 | 1/2013 | Schwarz et al. |
| 2013/0285455 A1 | 10/2013 | Hunter et al. |
| 2014/0040028 A1 | 2/2014 | King et al. |
| 2014/0108107 A1 | 4/2014 | Jones et al. |
| 2014/0172518 A1 | 6/2014 | King et al. |
| 2014/0174881 A1 | 6/2014 | King et al. |
| 2014/0231505 A1 | 8/2014 | King et al. |
| 2014/0289025 A1 | 9/2014 | King et al. |
| 2015/0084786 A1 | 3/2015 | King et al. |
| 2015/0106172 A1 | 4/2015 | Salama |

FOREIGN PATENT DOCUMENTS

| | | |
|---|---|---|
| EP | 0329129 A2 | 8/1989 |
| EP | 0980055 B1 | 9/2001 |
| FR | 2837583 A1 | 9/2003 |
| JP | 2002099640 A | 4/2002 |
| JP | 2005267430 A | 9/2005 |
| KR | 20050038077 A | 4/2005 |
| WO | WO-2005031494 A2 | 4/2005 |
| WO | WO-2006095352 A2 | 9/2006 |
| WO | WO-2009154787 A2 | 12/2009 |

OTHER PUBLICATIONS

Petition for Inter Partes Review of U.S. Pat. No. 7,854,310. IPR Case No. IPR2016-00068, filed Oct. 22, 2015, (64 pages).

Petition for Inter Partes Review of U.S. Pat. No. 8,595,054. IPR Case No. IPR2016-00069, filed Oct. 22, 2015, (67 pages).

Petition for Inter Partes Review of U.S. Pat. No. 8,595,054. IPR Case No. IPR2016-00070 filed Oct. 22, 2015, (61 pages).

Tung. Design of an advanced on-street parking meter. RIT Scholar Works. Thesis/Dissertation Collections (2001), (75 pages).

Cell Net Data Systems. First Wireless Monitoring of Parking Meters Results in Theft Arrests Using CellNet Data Systems Technology. PRNewswire, May 11, 1999, 2 pgs.

Fidelman. Time's Running Out for Parking Meters at Present Locations: $270,000 Cited as Replacement Cost. City Employees Who Ticket Motorists Find Electronic Meters Unsuitable. The Gazette, Final Edition, Montreal, Quebec, Canada, Nov. 12, 2002, p. A7.

Flatley. In San Francisco, Hackers Park for Free. Read filed under Misc. Gadgets, downloaded from www.engadget.com website on May 3, 2010, originally posted on Jul. 31, 2009, 5 pages.

Howland. How M2M Maximizes Denver's Revenue. Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001.

Meter Solutions, Single-Space Meters brochure, downloaded from www.duncansolutions.com website, revised Apr. 2006, 2 pages.

PCT/IB2006/054574 International Preliminary Report on Patentability dated Mar. 10, 2009, 1 page.

PCT/IB2006/054574 International Search Report dated Oct. 27, 2008, 4 pages.

PCT/US2010/047906 International Preliminary Report on Patentability dated Mar. 6, 2012, 1 page.

PCT/US2010/047906 International Search Report dated Mar. 30, 2011, 4 pages.

PCT/US2010/047907 International Preliminary Report on Patentability dated Mar. 15, 2012, 1 page.

PCT/US2010/047907 International Search Report dated Apr. 26, 2011, 4 pages.

Co-pending U.S. Appl. No. 14/811,641, filed Jul. 28, 2015.

Decision Denying Institution of Inter Partes Review dated Mar. 30, 2016 of U.S. Pat. No. 7,854,310. IPR Case No. IPR2016-00068.

Decision Denying Inter Partes Review dated Apr. 1, 2016 of U.S. Pat. No. 8,595,054. IPR Case No. IPR2016-00069.

Decision Denying Inter Partes Review dated Apr. 1, 2016 of U.S. Pat. No. 8,595,054. IPR Case No. IPR2016-00070.

Institution of Inter Partes Review dated Mar. 30, 2016 of U.S. Pat. No. 7,854,310. IPR Case No. IPR2016-00067.

Spyker et al. Predicting Capacitor Run Time for a Battery/Capacitor Hybrid Source. Power Electronic Drives and Energy Systems for Industrial Growth. 1998. Proceedings. 1998 IEEE International Conference, pp. 809-814.

* cited by examiner

PARKING METER

CROSS-REFERENCES TO RELATED APPLICATIONS

This application is a continuation application of U.S. patent application Ser. No. 14/059,260 filed Oct. 21, 2013, which is a continuation application of U.S. patent application Ser. No. 12/973,109 filed Dec. 20, 2010 (now U.S. Pat. No. 8,590,687 issued Nov. 26, 2013), which is a continuation application of U.S. patent application Ser. No. 12/072,524 filed Feb. 27, 2008 (now U.S. Pat. No. 7,854,310 issued Dec. 21, 2010), which claims priority to Australian Patent Application 2007900999 filed Feb. 27, 2007. The disclosures of these applications are hereby incorporated by reference, as if set forth in full in this document, for all purposes.

TECHNICAL FIELD

The present invention relates to parking meters and more particularly to electrically powered parking meters.

BACKGROUND OF THE INVENTION

Parking meters initially were coin operated. They were known to consist of a module to be fixed to a post having a lower end embedded in a ground surface typically adjacent a kerb adjacent which vehicles were to be parked. The parking meters were operated by inserting a coin and then turning a knob to activate a "clock" mechanism. When a certain period had expired, the parking meter would display a sign indicating the parking period had expired.

The above mentioned parking meters had a number of disadvantages including complexity of the working mechanisms, unreliability in respect of coins jamming and not being well adapted to provide a range of parking times and costs in respect thereof. A still further disadvantage is that they were restricted to coin operation.

OBJECT OF THE INVENTION

It is the object of the present invention to overcome or substantially ameliorate at least one of the above disadvantages.

SUMMARY OF THE INVENTION

There is disclosed herein a parking meter including:
a coin sensor;
a card reader;
an electronic device electrically connected to the sensor and reader so as to receive information electronically therefrom, a display to provide information visually, a telephone connection to provide receiving information in respect of a card used in respect of said card reader, and connections for at least one rechargeable battery to power the reader, sensor and device; and
a solar cell operatively associated with said connections to charge said battery;
a body having;
a front face having a coin slot into which coins are inserted for delivery to the sensor and then the coin storage facility;
a card slot into which a card is inserted to be read by said reader, and a rear face providing a window via which said solar cell is exposed to light, and providing visual access to said display.

Preferably, said meter includes an indicator to provide an indication whether a parking period has expired.

Preferably, said indicator is adjacent or at said rear face.

Preferably, said meter is adapted to be fixed to a post fixed to a ground surface, with said body including a set of panels to be fixed relative to said post, and a cover panel pivotally attached to the panel set for pivoting movement about a generally horizontal axis between a closed position and an open position.

Preferably, said meter includes controls at said front face via which a user can operate the parking meter.

Preferably, said coin sensor, said card reader, said device and said control panel are a module removable as an assembly from within said body.

Preferably, said module includes a body, and said coin sensor is a coin validator unit removably located in said body.

Preferably, said telephone is a mobile (cellular) telephone.

Preferably, said front face and rear face converge upwardly.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

In the accompanying drawings there is schematically depicted a parking meter assembly 10. The assembly 10 includes a base 11 that would be fixed to or embedded in a ground surface, typically adjacent the kerb at which a car is to be parked. Attached to the base and extending upwardly therefrom is a post 12 to the upper end of which there is attached a parking meter 13. The parking meter 13 includes a lower skirt 14 that is to be fixed to the post 12, an intermediate panel set 15, and a cover panel 16 pivotally mounted relative to the panel set 15. The cover panel 16 and panel set 15 provide a front face 17 having front face portions 18 and 19. The front face 17 includes a coin slot 25, a card slot 20 and a control panel 21. The control panel 21 includes a window 22, and buttons 24 that are manipulated by a user to operate the parking meter 13. The window 22 provides a user with means of viewing a screen 23 via which information is conveyed to the user. The information typically would include date, time and when the parking period is to expire and perhaps further information such as when the parking meter 13 is operable, information in respect of card use and cost.

Figure 1:
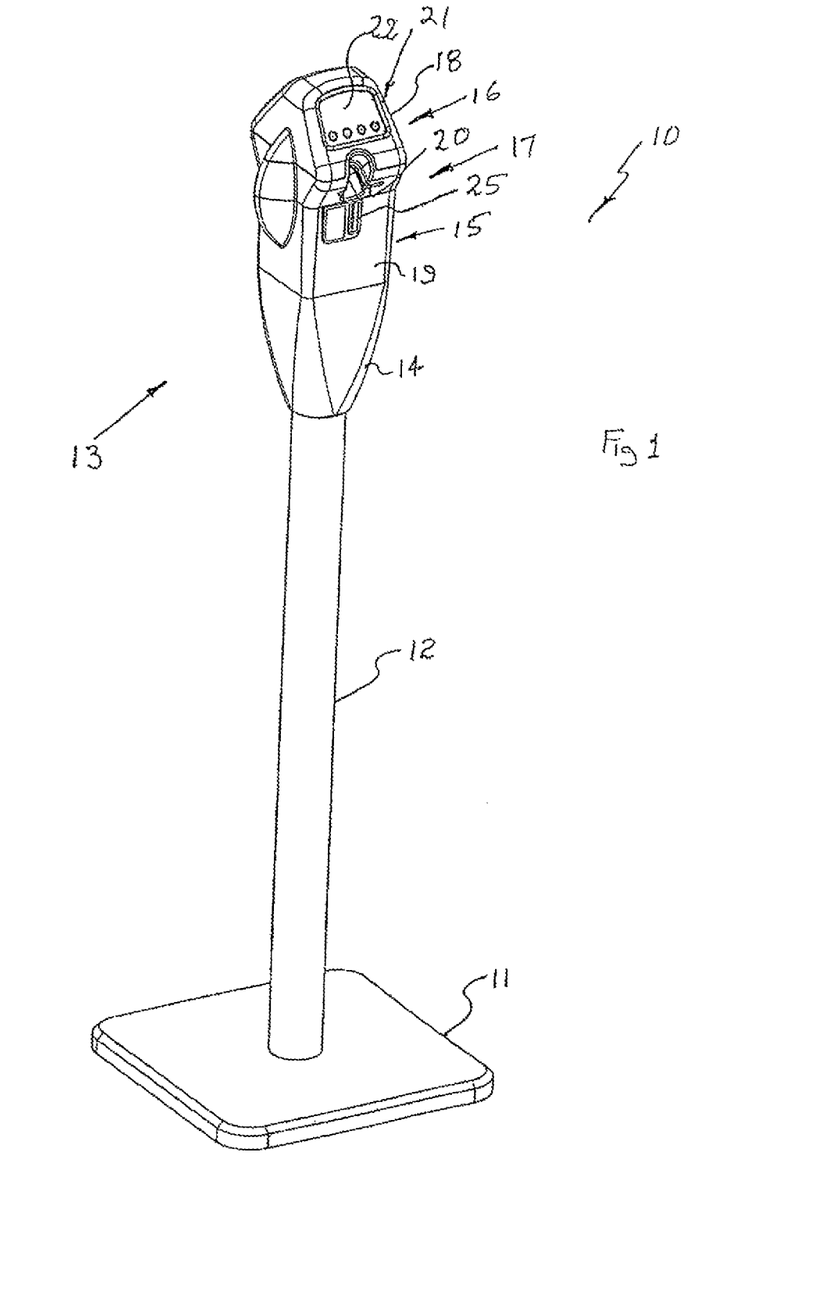
FIG. 1 is a schematic isometric view of a parking meter assembly.
Figure 2:
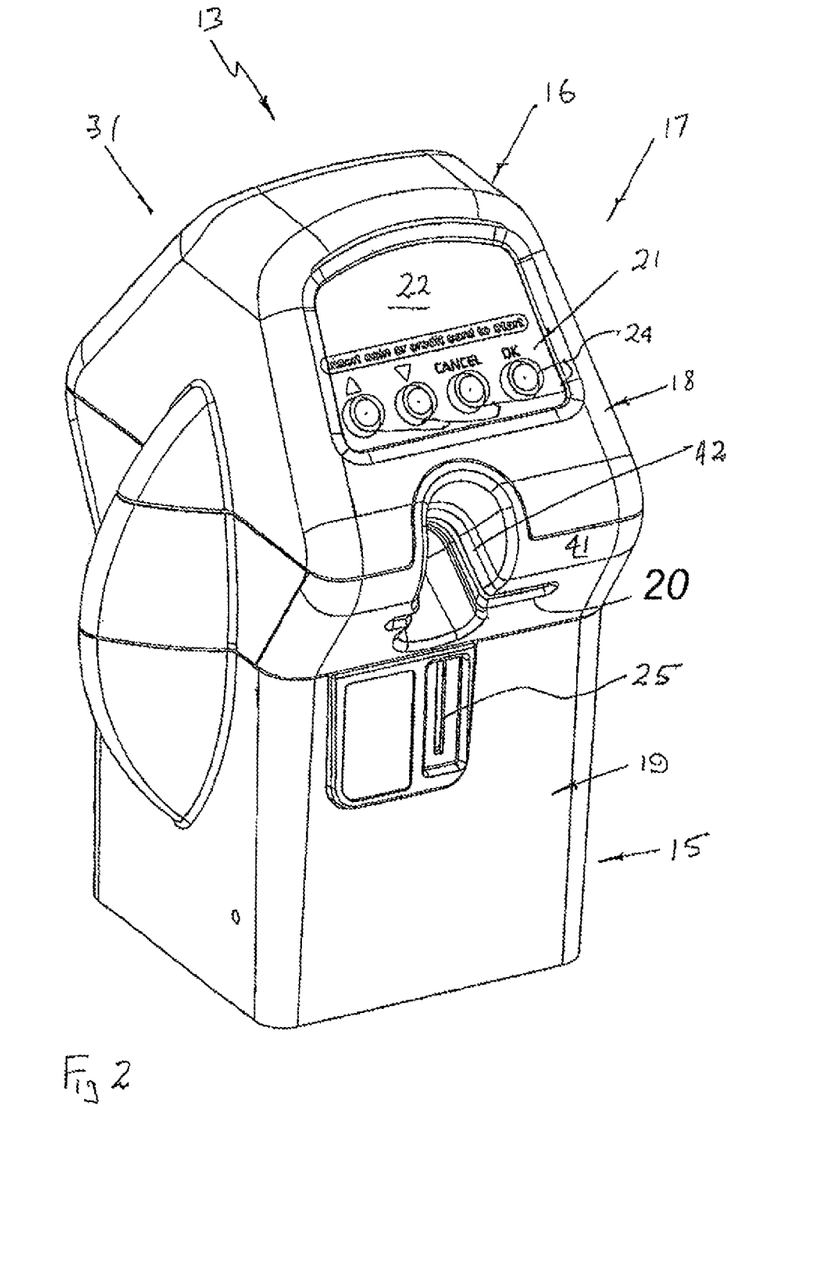
FIG. 2 is a schematic front isometric view of a parking meter employed in the assembly of FIG. 1.

The cover panel 16 is pivotally attached to the panel set 15 by means of a pivot 26 providing a generally horizontal pivot axis 45 that is generally normal to the post 12. The cover panel 16 is pivotally movable through an acute angle from the closed position as shown in FIGS. 1 and 2, to the open position shown in FIG. 4. In an alternative form, the panel 16 may be slidably attached.

Figure 3:
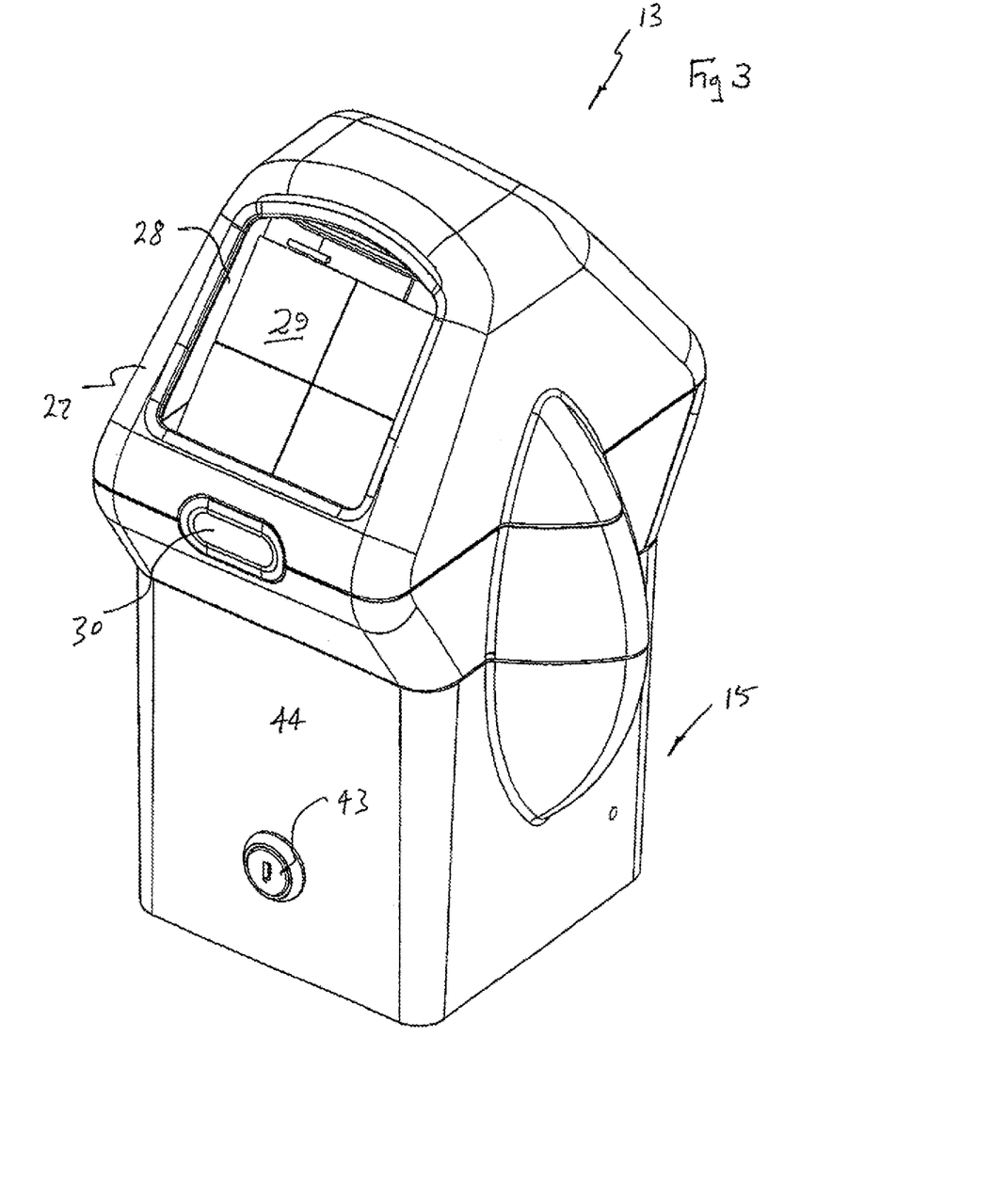
FIG. 3 is a schematic rear isometric view of the parking meter of FIG. 2.

The rear of the parking meter 13 includes a rear face 27 as part of the cover panel 16. The rear face 27 includes a window aperture 28 that receives a panel that provides for the transmission of light to a solar panel 29. The front face portion 18 and rear face 27 converge upwardly so that they are both inclined by acute angles to the horizontal.

At or adjacent the rear face 27 is an indicator 30 that can be viewed easily by a parking ranger moving past the meter 10, the indicator 30 providing an indication in respect of whether a parking period has expired.

When mounted adjacent a kerb separating a footpath from a roadway, the rear face 27 would face the adjacent roadway and the front face 17 away from the roadway so that a user would be standing on the footpath and facing their vehicle when operating the meter 13.

Figure 4:
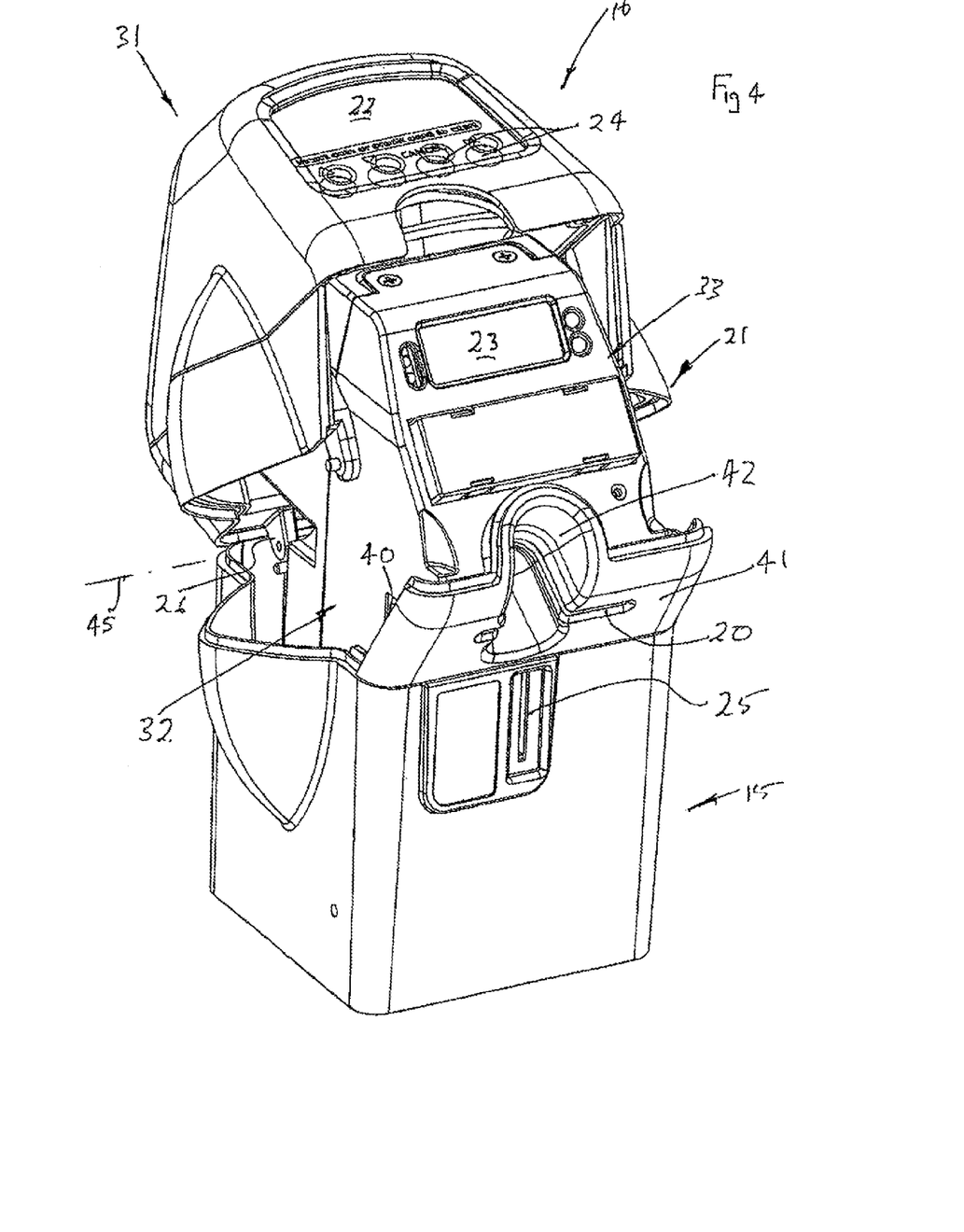
FIG. 4 is a schematic front isometric view of the parking meter of FIG. 2 with a top panel pivoted to an open position.
Figure 5:
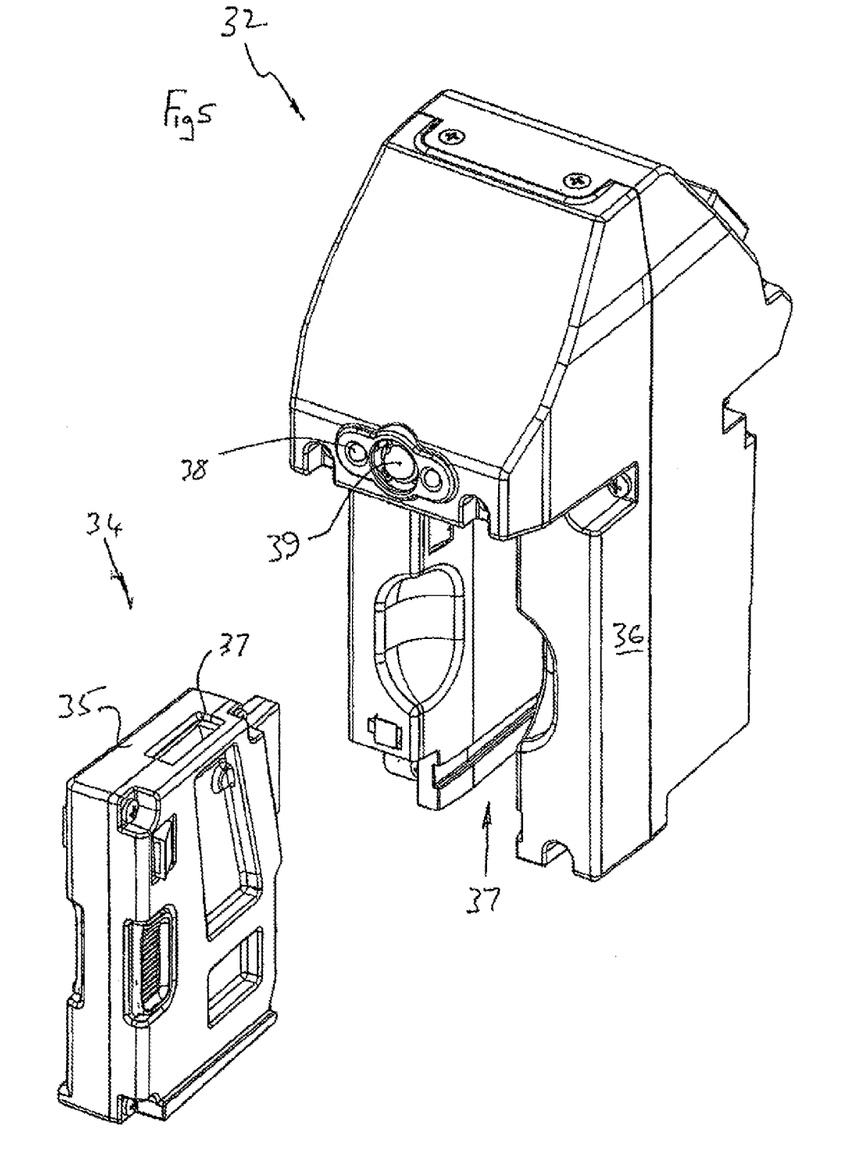
FIG. 5 is a schematic rear isometric view of a module of the parking meter of FIG. 2.

The panel set 15 and cover panel 16 provide a housing 31 within which a module 32 is located. The module 32 includes an electronic device 33 that incorporates the screen 23. The module 32 particularly includes a coin sensor 34 in the form of a coin validator 35. The coin validator 35 is received within a slot 37 of the body 36 of the module 32. Typically the coin validator 35 would provide a passage 37 through which coins would move to be "counted" and validated for the purposes of the coin validator 35 providing a signal in respect of whether appropriate coins have been delivered to the slot 25. Accordingly, the passage 37 would communicate with the slot 25 so as to receive coins therefrom. Once passing through the coin validator 35, the coins are delivered to a coin receptacle than can be cleared. The coin receptacle is located behind the skirt 14 which preferably has a door to provide for access to the coin receptacle. The coin validator 35 is provided as a unit and is removable from the module 32, when the module 32 is removed from within the housing 31.

The module 32 is also provided with a light (LED) 38 and/or colour disk 39 that are operated to provide an indication in respect of whether a parking period has expired. The light 38 and/or disk 39 are part of the indicator 30 and can be seen by the parking ranger. Typically the disk 39 would be pivotally mounted and would be "flipped" to be black or red, the red indicating that a parking period has expired.

Located immediately behind the slot 20 is a card reader 40 that would read the magnetic strip (or other information providing device) on a credit or debit card.

The coin validator 35 and card reader 40 are electrically linked to the control panel 21 to provide information therefore in respect of whether payment has been made.

Preferably, the device 33 would include a mobile (cellular) phone link so that information may be conveyed and received in respect of a credit or debit card read by the card reader 40. The device 33 may also include a power supply (battery), an IR port and LED status indicators.

Preferably, the slot 20 is located in a plane that is inclined to the horizontal by an acute angle so that the slot 20 slopes downwardly to an inclined surface 41 being part of the front face 17. The surface 41 is downwardly facing so as to protect the slot 20 from water penetration. The surface 41 is also provided with a recess 42 enabling a user's fingers to hold the card while "swiping" card through the slot 20.

A key operated lock 43 is located in a rear panel 44 of the panel set 15, the lock 43 being operable to release the cover panel 16 when appropriate key is used.

What is claimed is:

1. A single space parking meter comprising:
   a card reader;
   an electronic device electrically connected to the card reader so as to receive information electronically therefrom, the electronic device having a screen to provide information visually, a communication connection to provide receiving information in respect of a card used in respect of the card reader, and connections for at least one rechargeable battery to power the card reader, and the electronic device;
   a solar cell operatively associated with the connections to charge the at least one rechargeable battery;
   a housing in which the card reader and the electronic device are located, the housing comprising an intermediate panel set and a cover panel, wherein the cover panel is configured to attach to the intermediate panel set by a dual attachment element comprising a slideable mount and a pivotal mount, the cover panel comprising a plurality of buttons that operate the parking meter upon manipulation by a user; and
   a window aperture in the cover panel via which the solar cell is exposed to light;
   wherein the card reader is electrically linked to provide information to the electronic device to provide information of whether payment has been made;
   wherein the screen of the electronic device is visible through the window of the cover panel when the cover panel is attached to the intermediate panel.

2. The parking meter of claim 1, wherein the meter comprises an indicator to provide an indication whether a parking period has expired.

3. The parking meter of claim 1, wherein the meter is adapted to be fixed to a post fixed to a ground surface, with the intermediate panel set comprising a set of panels to be fixed relative to the post.

4. The parking meter of claim 1, wherein the card reader, the electronic device, and the screen are a module removable as an assembly from within the housing.

5. The parking meter of claim 1, wherein the communication connection is a mobile (cellular) telephone connection.

6. The parking meter of claim 1, wherein the card reader is configured to read credit cards or debit cards.

7. A single space parking meter comprising:
   a housing comprising an intermediate panel set and a cover panel, the cover panel configured to attach to the intermediate panel set by a dual attachment element comprising a slideable mount and a pivotal mount, wherein the housing comprises a first window, a plurality of buttons that operate the parking meter upon manipulation by a user, the plurality of buttons on the cover panel, and a second window;
   a module configured to be removably received by the housing, the module comprising:
   a) a card reader, and
   b) an electronic device electrically connected to the card reader so as to receive information electronically therefrom, the electronic device comprising:
      i) a screen to provide information visually via the first window when the cover panel is attached to the intermediate panel set,
      ii) a communications connection to provide receiving information in respect of the card reader,
      iii) a rechargeable battery electrically coupled to provide power to the card reader and the electronic device, and iv) a solar cell operatively coupled with the rechargeable battery to charge the rechargeable battery, the solar cell configured to receive light via the second window;

wherein the card reader is electrically linked to provide information to the electronic device to provide information of whether payment has been made.

8. The parking meter of claim 7, wherein the meter comprises an indicator to provide an indication whether a parking period has expired.

9. The parking meter of claim 1, wherein the meter is adapted to be fixed to a post fixed to a ground surface, with the intermediate panel set comprising a set of panels to be fixed relative to the post.

10. The parking meter of claim 7, wherein the communication connection is a mobile (cellular) telephone connection.

11. The parking meter of claim 7, wherein the card reader, the electronic device, and the screen are a module removable as an assembly from within the housing.

12. The parking meter of claim 7, wherein the card reader is configured to read credit cards or debit cards.

\* \* \* \* \*